United States Patent
Markut-Kohl et al.

(10) Patent No.: US 12,109,747 B2
(45) Date of Patent: Oct. 8, 2024

(54) PROCEDURE FOR CHECKING THE SUITABILITY OF A SHAPING TOOL

(71) Applicant: ENGEL AUSTRIA GmbH, Schwertberg (AT)

(72) Inventors: Ruth Markut-Kohl, Vienna (AT); Klemens Springer, Leonding (AT)

(73) Assignee: ENGEL AUSTRIA GMBH, Schwertberg (AT)

( * ) Notice: Subject to any disclaimer, the term of this patent is extended or adjusted under 35 U.S.C. 154(b) by 637 days.

(21) Appl. No.: 16/889,061

(22) Filed: Jun. 1, 2020

(65) Prior Publication Data

US 2020/0391423 A1    Dec. 17, 2020

(30) Foreign Application Priority Data

Jun. 3, 2019   (AT) ............... A 50504/2019

(51) Int. Cl.
*B29C 45/76*    (2006.01)
*G05B 19/4155*   (2006.01)

(52) U.S. Cl.
CPC ........ *B29C 45/766* (2013.01); *G05B 19/4155* (2013.01); *B29C 2945/76913* (2013.01); *G05B 2219/45244* (2013.01)

(58) Field of Classification Search
CPC ...... G05B 19/4155; G05B 2219/45244; G05B 19/4069; B29C 45/84; B29C 45/76; B29C 45/26; B29C 45/766; B29C 2945/76163; B29C 2945/76939; B29C 2945/76438; B29C 2945/76254; B29C 2945/76913; B29C 2945/76916; B29C 2945/76732
See application file for complete search history.

(56) References Cited

U.S. PATENT DOCUMENTS

| | | | |
|---|---|---|---|
| 5,035,598 A | | 7/1991 | Fujita et al. |
| 5,350,547 A | * | 9/1994 | Yamaguchi ........... B29C 45/766 425/162 |

(Continued)

FOREIGN PATENT DOCUMENTS

| | | |
|---|---|---|
| DE | 60 2005 005 128 | 5/2009 |
| DE | 10 2010 037 552 | 3/2012 |

(Continued)

*Primary Examiner* — Monica A Huson
(74) *Attorney, Agent, or Firm* — WENDEROTH, LIND & PONACK, L.L.P.

(57) ABSTRACT

Method for checking the suitability of a moulding tool for a defined moulding process includes providing an electronic dataset in which each of different features of a moulding tool has a range of possible values; selecting a feature of the electronic dataset as a characterizing feature; establishing an identity of the moulding tool by at least one value of the value range of the characterizing feature, wherein a moulding tool to be checked is regarded as identical to the moulding tool precisely when the established value is present in relation to the characterizing feature; providing an electronic tool dataset including a plurality of different features; allocating the electronic tool dataset to the moulding tool with the established identity by a computing unit; and checking the electronic tool dataset with the computing unit in relation to the suitability of a moulding tool with the established identity in the defined moulding process.

8 Claims, 4 Drawing Sheets

(56) References Cited

U.S. PATENT DOCUMENTS

Figure 1A:
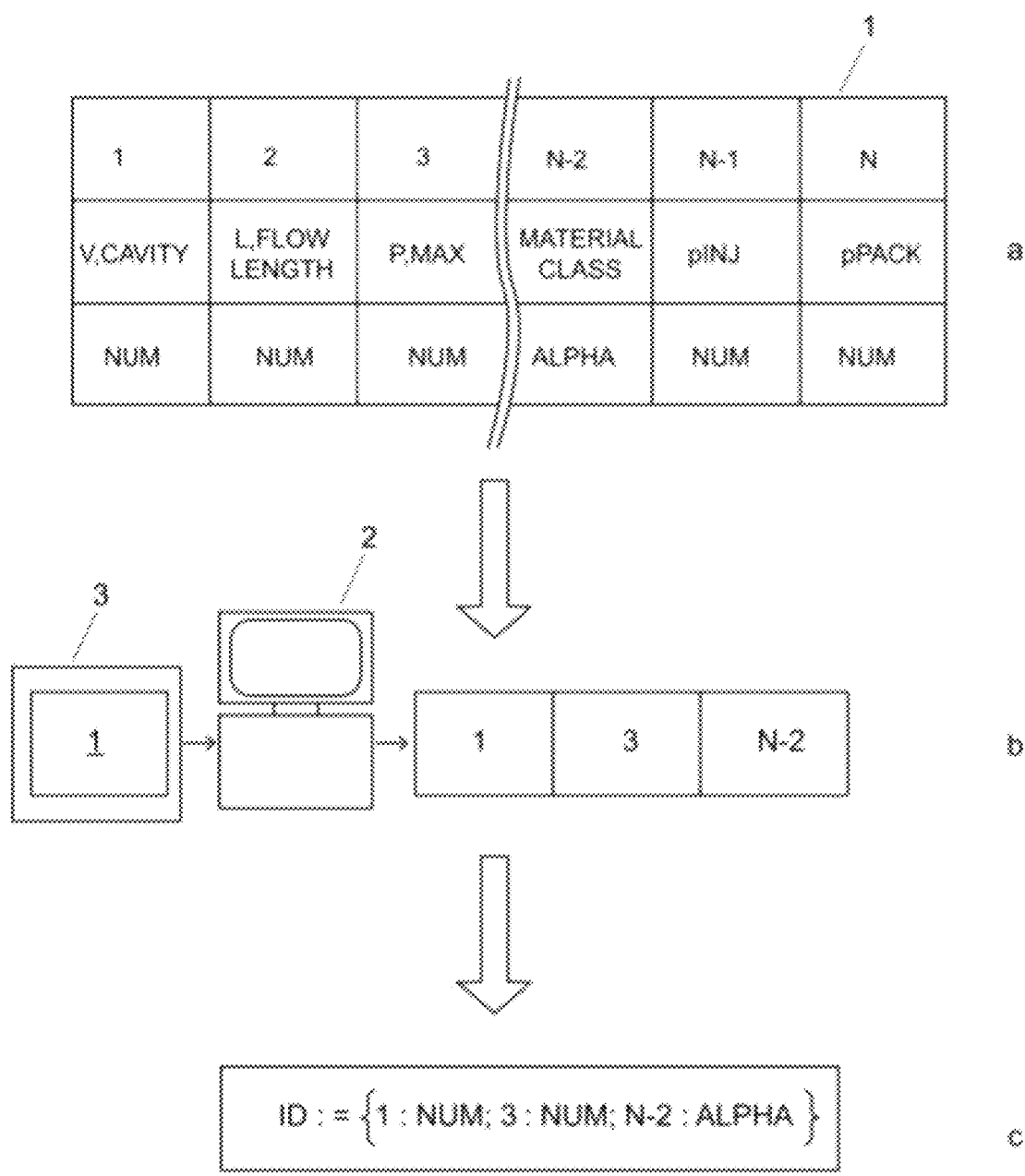

| | | | | |
|---|---|---|---|---|
| 5,914,077 | A * | 6/1999 | Fujita | B29C 45/50 700/200 |
| 5,914,884 | A * | 6/1999 | Gur Ali | B29C 45/76 700/47 |
| 6,051,170 | A * | 4/2000 | Kamiguchi | B29C 45/766 700/200 |
| 6,161,057 | A * | 12/2000 | Nakano | B29C 45/7693 700/203 |
| 6,816,820 | B1 * | 11/2004 | Friedl | G06F 30/23 703/2 |
| 7,096,083 | B2 * | 8/2006 | Kaneto | B29C 45/76 700/197 |
| 7,374,413 | B2 | 5/2008 | Saito et al. | |
| 7,840,306 | B2 * | 11/2010 | Di Domenico | B22D 17/007 700/197 |
| 9,180,617 | B2 * | 11/2015 | Tsai | B29C 45/766 |
| 10,611,071 | B2 | 4/2020 | Schiffers | |
| 11,000,982 | B2 * | 5/2021 | Stoehr | G05B 19/41885 |
| 11,034,070 | B2 | 6/2021 | Gergov et al. | |
| 11,623,378 | B2 | 4/2023 | Gergov et al. | |
| 2006/0068050 | A1 | 3/2006 | Saito et al. | |
| 2010/0292970 | A1 * | 11/2010 | Brincat | G06F 30/23 703/6 |
| 2016/0229101 | A1 | 8/2016 | Schiffers | |
| 2018/0117817 | A1 | 5/2018 | Mensler et al. | |
| 2019/0005164 | A1 | 1/2019 | Gergov et al. | |
| 2019/0105826 | A1 | 4/2019 | Gergov et al. | |
| 2021/0260805 | A1 | 8/2021 | Gergov et al. | |

FOREIGN PATENT DOCUMENTS

| | | |
|---|---|---|
| DE | 10 2015 107 025 | 11/2016 |
| EP | 0 368 300 | 5/1990 |
| JP | H0655597 A | 3/1994 |
| JP | 2000-313035 A | 11/2000 |
| JP | 7047080 B2 | 4/2022 |
| WO | 2015/055636 | 4/2015 |
| WO | 2019/079835 | 5/2019 |

* cited by examiner

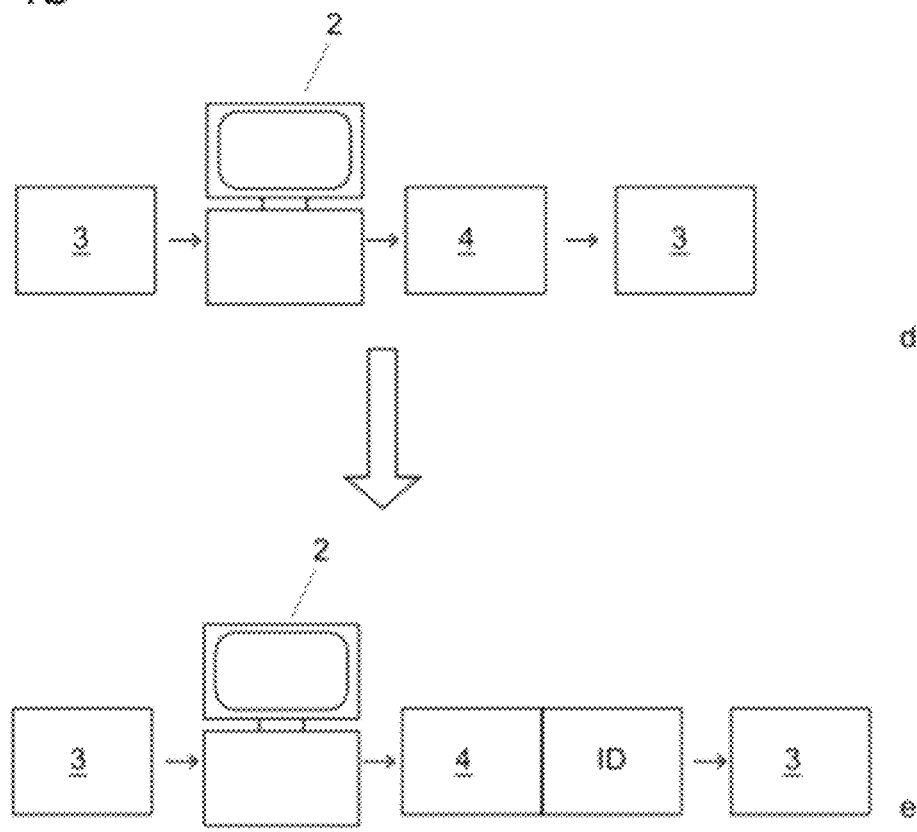
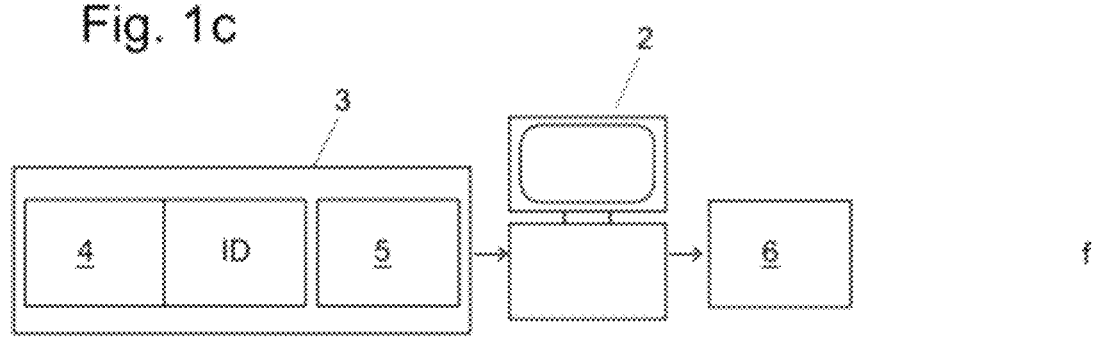

PROCEDURE FOR CHECKING THE SUITABILITY OF A SHAPING TOOL

The invention relates to a method for checking the suitability of a moulding tool for a defined moulding process, computer program products which prompt a computing unit to carry out parts of the method or all of the method, and a moulding machine.

Moulding tools are used in moulding machines in order to produce one or more moulded parts in a moulding process. Among other things, peripheral devices can also be included in the term moulding machines.

According to the state of the art, process settings of a moulding machine and/or actual value progressions of a moulding process are often transferred manually, e.g. into injection moulding simulation software or calculation programs, for comparing the moulding process with a simulation of the same or with physical calculations relating to it. According to the state of the art, a considerable effort is required for comparisons of this kind with parameters of physical calculations, results of the moulding process and/or simulation parameters or simulated results of a moulding process.

For one thing, process settings and actual value progressions from moulding processes carried out on real moulding machines (in short: reality) must be stored uniquely allocatable to moulding tools. In addition, the results simulated for the corresponding moulding process and/or the simulation parameters used in a simulation (in short: simulation) and/or physical calculations or parameters of the moulding process must be stored uniquely allocatable to moulding tools. Then, a comparison of reality and simulation can be carried out when the unique identification agrees.

Normally, the determination of the parameters and/or results in reality and in the simulation is carried out by different people, in addition usually also in different companies. Comparisons or an exchange of results and/or parameters can prove to be difficult because of the selection/definition of different identifications (e.g., names) for one and the same object (moulding tool).

It is extremely important for the operation to prevent damage or consequential damage to a moulding tool as well as the moulding machine used for it.

For this reason, according to the state of the art and independently of the moulding tool used in connection with a moulding machine, ranges are used for process settings of the moulding machine in order to prevent damage. In the best case, the respective machine operator has setting cards for the tool design, simulation reports or similar for each moulding tool, from which limits and setting guidelines to be taken into consideration in relation to the moulded part and/or the moulding tool can be learned.

However, even if parameters and/or setting guidelines and/or systematic setting processes such as Scientific Molding, Six Sigma, etc. and/or limits in relation to the operation of a moulding tool on a moulding machine which have been determined with a simulation (e.g. injection moulding simulation) or also by means of physical and/or statistical calculations or models based on the moulded part and/or moulding tool and/or material data and/or data of the moulding machine are available, these are not usually transferred into the control unit of a moulding machine, or are only copied over manually.

Checks on setting ranges not carried out and/or problems with transferring provided ranges for damage-free operation of a moulding tool in a moulding machine and/or of a moulding machine can be attributed to the following reasons:

There are no setting ranges available for the moulding tool in question.

The moulding machine envisaged for the transfer is possibly not suitable for carrying out the moulding process. This can arise, e.g., due to exceeding the maximum necessary clamping force, the maximum necessary injection pressures, the necessary metering volume, etc.

The parameters or results of the simulation to be applied differ significantly from realistic process settings and/or actual value progressions of a moulding process. This can be caused for example by machine effects disregarded in the simulation program, such as e.g. pressure losses, accelerations, maximum torques, etc.

When the values of the simulation are used without further adaptation or checking, damage can thereby be caused to the moulding tool and/or the moulding machine.

In WO 2015/055636 A1, a method is disclosed in which moulding tools are classified in categories. This takes place by calculating the quotient of pressure rise and melt volume displaced during the compression phase or by calculating the quotient of melt volume displaced during the holding-pressure phase and injection phase on the basis of at least one moulding process being carried out.

In EP 368 300 A2, the creation of a part dataset (process settings of a moulding machine) using the results of a filling simulation and a check of the technical data of the moulding machine is disclosed.

DE 10 2015 107 025 A1 discloses determining and displaying process parameter values in an injection moulding process, wherein a pressure curve specific to the moulded part is used for the characterization of the injection moulding process.

In summary, the state of the art has the following problems:
considerable effort and susceptibility to errors when comparing simulation and reality (absence of a unique identification, use of manual processes)
possible damage to the moulding tool due to no checking, or non-automated checking, of limitations
possible damage to the moulding machine due to no checking, or non-automated checking, of limitations The object of the invention is the provision of a method for checking the suitability of a moulding tool for a defined moulding process, in which the susceptibility to errors of a comparison of a simulated moulding process and a real moulding process is reduced, as well as the provision of computer program products which prompt a computing unit to carry out parts of the method or all of the method, and of a moulding machine, the machine control system of which is configured to carry out the method according to the invention.

This object is achieved by a method with the features of claim 1, a computer program product and a moulding machine. Advantageous embodiments of the invention are defined in the dependent claims.

The configuration of the machine control system of the moulding machine for carrying out the method according to the invention can be effected, for example, such that the machine control system is granted access to one of the computer program products according to the invention, for example in that a computer program product is stored in a local electronic memory of the machine control system or a data-transferring connection is made to a remote electronic memory via a network.

Steps a, b and c of the method according to the invention can be effected automatically by means of a computing unit or by an operator. Steps d, e and f of the method according to the invention are effected automatically.

Examples of different features of the electronic dataset provided in step a can be (individually or in any desired combination):
  actual value progressions and values calculated therefrom (detected during a moulding process)
  category of moulded part (e.g.: thick-walled moulded part, thin-walled moulded part, technical part, etc.)
  data relevant to the moulding tool (weight, geometry, sprue positions, limits, instructions for installation and/or commissioning of the moulding tool, cavity, moulded part, temperature control, hot runner, compressed-air connections, special equipment, moulded part quality criteria, serial number, . . . )
  moulding machine used for the moulding process (relevant limits such as maximum clamping force, maximum injection pressure, maximum torques, maximum accelerations, temperatures, process settings, machine parameters such as regulator settings)
  material data used for the moulding process (parameters such as viscosity, limits of the processing temperature, etc.)
  configuration, used for the moulding process, of the moulding machine (machine setup such as injection unit, clamping unit, ejector, nozzle, core pullers, etc.; drive design; control system design) and configuration of the production cell
  physical correlations and/or models and/or simulations of the moulding machine and/or of the moulding process and/or of all above features as well as all features mentioned in Table 1.

Further detailed descriptions of possible features are reproduced in Table 1.

The selection in step b can be effected from various points of view:

For example, a free choice can be made of the at least one feature of the electronic dataset as a characterizing feature.

For example, the selection of the at least one feature of the electronic dataset as a characterizing feature can be effected in respect of an intended use (e.g. production of a moulded part in the form of a screw cap for a bottle), with the result that all those moulding tools which can be used in the intended use are considered to be identical, e.g. because they can be operated with required process settings of the intended use.

The possibility that all those moulding tools which can be operated using the same material type are said to be identical, with the result that e.g. substantially the same compressive modulus is present for all materials of the material type, may be mentioned as a further example. In the case of the identity agreeing, it is then known that the compressive modulus for the moulding tool to be checked must be substantially equal to a value or value range which is present in relation to that moulding tool, in relation to which the identity was defined.

With the aid of the invention, exclusively due to the feature or features of the electronic dataset used in step b for the characterization (characterizing feature or characterizing features), in step c a moulding tool can be identified by at least one value of the value range of the respective characterizing feature, i.e. an identity of the moulding tool can be established, wherein a moulding tool to be checked is regarded as identical to this moulding tool if in each case the at least one established value is present in relation to the characterizing feature or in relation to all characterizing features. A pool of possible features is therefore available which can be used to establish the identity.

If the value range of the at least one characterizing feature has only one single possible value, then, for a moulding tool to be checked to be identical, it is of course necessary that the at least one characterizing feature of the moulding tool to be checked has precisely this single possible value.

In contrast, if the value range of the at least one characterizing feature has a plurality of possible values (discrete or continuous), there exists the possibility, for establishing the identity, of choosing a single value or several values as at least one established value, or of specifying the at least one established value in the form of a value range.

For a moulding tool to be checked to be identical with a moulding tool of predefined identity, it can be sufficient, in relation to a characterizing feature with a value range in the form of several values or in the form of a numeric interval, if the moulding tool to be checked has a value in relation to the characterizing feature which (for multiple values) is equal to one of the several values or (for a numeric interval) lies within the defined numeric interval.

An example of this: a mass m of the moulding tool is chosen as characterizing feature. A mass interval of e.g. 0 kg<m<570 kg is chosen as the at least one established value of the value range of the characterizing feature. The moulding tool to be checked has a mass of m=400 kg. In this example it is then to be regarded as identical to the moulding tool, the identity of which has been established.

It is to be noted here that moulding tools with the same identity with regard to the characterizing features, on the basis of which their identity has been established, cannot be differentiated. This does not mean by implication that these moulding tools would be numerically identical, i.e. the same object.

Both single or multiple features of the electronic dataset as well as functions and functionals can form an identity (ID) as a function of single or multiple features.

Subsequent examples represent possible identities (ID) of a moulding tool according to the above definition, wherein various numbers of different characterizing features have been used:

$ID:=\{ID_{V,Cavity}:V_{cavity}\}=\{1:50\}$ $ID:=\{ID_{V,Cavity}:V_{Cavity}; \ ID_{l,flowLength}:l_{flowLength}\}=\{1:42; 2:0.21\}$ $ID:=\{ID_{V,Cavity}:V_{Cavity}; \ ID_{p,max}:p_{max}\}=\{1:61; 3:1200\}$ $ID:=\{ID_{V,Cavity}:V_{Cavity}:ID_{F,clamp,max}: 0.9*A_{screw}*p_{max}\}=\{1:61; 4:4900000\}$ $ID:=\{ID_{V,Cavity}:V_{Cavity}; \ ID_{MaterialClass}:MatClass; \ ID_{plnj}: plnjArr; \ ID_{pPack}:pPackArr\}=\{1:61; 5:$ Polypropylene; 6:[0,0; 0.2, 100; 0.3, 500; 0.5, 1000]; 7 [0.55, 1150; 0.6, 1070; 0.65, 900; 1.5, 900]$\}$ For the formation of an identity, an identification mark and a value from the value range of the respective feature are allocated to each characterizing feature used, wherein the SI unit used can already be established through the identification mark. One identification mark is used for each characterizing feature used for an identity.

A further possibility for the formation of an identity can be formulated as follows, for example:

$ID:=\{ID_{V,Cavity}; \ ID_{l,flowLength}; \ ID_{p,max}; \ ID_{F,clamp,max}\}=\{61; 0; 0; 4900000\}$ Here, a fixed position within an ordered n-tuple is allocated to each characterizing feature as identification mark.

The examples in no way limit the formation of the identity.

The value ranges of the plurality of different features of the provided electronic dataset can e.g. be discrete (e.g. only assume defined values) or be continuous (e.g. value intervals) and/or include alphanumeric characters (e.g. the name of a material for the moulding process).

For better comprehensibility, the identification marks used in the above examples are mentioned below with a description:

$ID_{V,Cavity}$=1 metering volume in $10^{-6}$ m$^3$
$ID_{l,flowLength}$=2 maximum flow length in m
$ID_{p,max}$=3 maximum pressure occurring in $10^5$ Pa
$ID_{F,clamp,max}$=4 maximum clamping force required in N
$ID_{MaterialClass}$=5 material class (e.g. PP, ABS, . . . )
$ID_{pInj}$=6 curve progression of the injection pressure in the injection phase in s; $10^5$ Pa
$ID_{pPack}$=7 curve progression of the injection pressure in the holding-pressure phase in s; $10^5$ Pa This is not a complete list. In the case of curve progressions, these can be downsampled, i.e. aggregated, during the derivation of e.g. actual value progressions.

To determine the magnitudes of the values of the characterizing features for the creation of the identity:
- a moulding process can be carried out and/or
- an operator input of corresponding values in a computer program product and/or a machine control system of a moulding machine and/or in operating units worn on the body can be effected, wherein these can form the basis of subsequent derivations and/or
- data of the tool design of the moulding tool, such as e.g. the CAD geometry, etc. can be used and/or
- data relevant to carrying out the process for the production of the moulded part can be accessed from systems such as MES, ERP, etc.

A moulding process can be effected both in a real moulding machine and in a simulation.

In a manner known per se, in step d an electronic tool dataset for the moulding tool, which comprises a plurality of different features, is provided or created by means of a computing unit.

In step e, the electronic tool dataset provided or created in step d is uniquely allocated to a moulding tool via the established identity by means of a computing unit and, in a preferred embodiment, stored in an electronic memory (e.g. an electronic database). To determine the necessary values of the features of the electronic tool dataset, the data used for the determination of the necessary values of the characterizing features can be accessed and/or once again
- a moulding process can be carried out and/or
- an operator input of corresponding values in a computer program product and/or a control unit of a moulding machine and/or in operating units worn on the body can be effected, wherein these can form the basis of subsequent derivations, i.e. calculations, and/or
- data of the tool design, such as e.g. the CAD geometry, etc. can be used and/or
- data relevant to carrying out the process for the production of the moulded part can be accessed from systems such as MES, ERP, etc.

A moulding process carried out in this regard can be effected both in a real moulding machine and in the simulation.

It is particularly preferably provided that the provision or creation of the electronic tool dataset for the moulding tool at least or solely uses the provided electronic dataset.

In step f, the data of the electronic tool dataset (or at least parts thereof), allocated in step e to the identity established in step c, are checked in relation to the suitability in a defined moulding process—optionally using calculation rules and/or simulations. The moulding process can be checked using at least one of the following data, for example:
- actual value progressions and values calculated therefrom (detected during a moulding process)
- data relevant to the moulding tool (weight, geometry, sprue positions, limits, instructions for installation and/or commissioning of the moulding tool, cavity, moulded part, temperature control, hot runner, compressed-air connections, special equipment, moulded part quality criteria, serial number, . . . )
- moulding machine used for the moulding process (masses, lengths, relevant limits such as maximum clamping force, maximum injection pressure, maximum torques, maximum accelerations, temperatures, process settings, machine parameters such as regulator settings)
- material data used for the moulding process (parameters such as viscosity, limits of the processing temperature, etc.)
- configuration, used for the moulding process, of the moulding machine (machine setup such as injection unit, clamping unit, ejector, nozzle, core pullers, etc.; drive design; control system design) and configuration of the production cell
- physical correlations and/or models and/or simulations of the moulding machine and/or of the moulding process and/or of all features mentioned above as well as in Table 1.

The checking itself can be carried out manually and/or automatically by means of numerical and/or logical comparative operations.

The data mentioned for the checking can, e.g., be provided by means of a data memory connected via a remote data transfer connection.

Checks of this type may be mentioned by way of example:
0<vInject<120
MaterialClass==Material
"Use magnetic clamping device."∈Installation instructions
pMaxInj<2400
1100000<Fmax<1300000
1100000≤Fmax≤1100000

The last example shows that an infinitesimally small range of an equivalence condition equates to a single value.

In a preferred embodiment example, for the moulding process in question, on a moulding machine mentioned in a list or also a moulding machine specifically defined by an operator, the prohibited ranges for features of the electronic tool dataset used for the checking, e.g. the process settings, are predefined. Further uses for prohibited ranges are e.g. the plastic material, ambient conditions, etc. The moulding processes carried out and used in this step can be effected both in a real moulding machine and in a simulation. In the case of such a simulation, both the moulding process and/or the moulding machine (taking into consideration components such as drives, mechanisms, etc.) can be taken into consideration.

The moulding machine specifically defined by an operator can be made available as a function of a unique identification or similar. If no unique identification of a moulding machine is available to the operator, they can configure a moulding machine virtually for this purpose using data such as e.g. injection side size, clamping side size, drive variant, . . . .

The—in this case permitted—ranges used for the checking can also be predefined for derivations of features of the electronic tool dataset, i.e. by means of calculations or of basic rules of determined values, such as for example:
If(material==PA)Then $$0 < vInject < 150$$

Otherwise $$0 < vInject < 120$$

More generally speaking, in an embodiment example of the invention it is provided that, as a function of the checking of the electronic tool dataset in relation to the suitability of the moulding tool with the established identity ID in the defined moulding process, an adaptation of at least one feature of the electronic tool dataset is carried out, with the result that an adapted electronic tool dataset is obtained for the moulding tool with the established identity ID. In the process it can be provided that the step of checking the electronic tool dataset by means of a computing unit in relation to the suitability of the moulding tool with the established identity ID in the defined moulding process is repeated with the adapted electronic tool dataset.

The information required in relation to the method according to the invention can be provided to the devices involved, such as computing units, moulding machines, etc., both on a computing unit or via a mobile data medium or also via remote data transfer connection.

In a preferred embodiment of the invention, at least one moulding machine that can be used for the moulding process simulated in the injection moulding simulation software or for a real moulding process is proposed.

A particularly preferred embodiment of the invention (as an example of a moulding machine formed as a plastic injection moulding machine) can be formulated as follows, wherein each of the steps can be optional according to the degree of complexity of the simulation and in addition can be combined with another step in each case:

Step 1:
The article design of the moulded part and/or the tool geometry (e.g. CAD data) of the moulding tool are provided for carrying out a simulation.

Step 2:
An identity of the moulding tool and/or of the moulded part is created using the features of the electronic tool dataset known from step 1, as defined in steps a-c of the method according to the invention.

Step 3:
The geometries of the moulded part and of the moulding tool are processed and prepared for carrying out a simulation. In the process, these are possibly augmented by parts such as e.g. sprue systems and cooling systems.

Step 4:
The flowed-through geometries (moulded part, cooling system) are divided into finite geometric bodies (FEM, FVM, . . . ), and the injection points, including opening times, are set.

Step 5:
The plastic material is selected.

Step 6:
The process settings relating to the moulding machine, such as e.g. injection rate, holding pressure behaviour, cooling, etc. are defined or are derived on the basis of calculations from at least one of the previous steps 1-5. The plastic material introduced in step 5 may be used by way of example for this, on the basis of which the process settings, e.g. nominal temperature values of the heating zones of a barrel of the moulding machine, can be derived.

Step 7:
Depending on the degree of detail, a computer-aided simulation can be carried out and actual values of variables such as injection rates, pressures, temperatures, fill times, etc. can be determined or the process settings can be used directly for the further steps.

Step 8:
The variables available in steps 1-7, such as e.g. process settings, tool specifications, material data, etc. are uniquely allocated to the moulding tool by means of the identity created in the method according to the invention, as defined in steps d-e of the method according to the invention. In a further preferred embodiment, the identity of the moulding tool is created on the basis of all characterizing features available in steps 1-7 or the identity created in step 2 is correspondingly adapted and then all variables available in steps 1-7 are likewise uniquely allocated to the moulding tool. In each case, an electronic tool dataset provided with the identity of the moulding tool is thus formed, Step 9:
The results are analyzed. If necessary, parameters are adapted and a new iteration of the simulation is started at step 6.

Step 10:
The findings concerning process settings obtained in step 6 are checked and adapted in step f according to the invention for application to the moulding machine used by the machine operator. In the process, e.g. parameters of the injection and clamping side of the moulding machine as well as of the drive variant are taken into consideration and it is checked whether the injection moulding process for the simulated moulded part can be carried out on the moulding machine in question. For the checking, the maximum possible motor torques of the drives and/or limitations of the derivations of the speed and/or of the maximum injection pressure, a meaningful range of the metering volume, temperature ranges as a function of the material used, etc. may be mentioned here by way of example. The parameters necessary for the checking are provided automatically and/or via remote data transfer connection.

The adaptation of the parameters can e.g. relate to an injection profile of the moulding process resulting from step 6 in the following form: the process setting in question is present as a curve progression not suitable for the moulding machine in question, with the result that the curve progression cannot be followed by the moulding machine in question (see FIG. 2—dashed line). Therefore, for the injection profile, the possible ranges for application to the moulding machine are already mentioned in advance (see FIG. 2—below the continuous line, hatched).

This can be implemented in a similar manner for all further nominal process settings.

This example is in no way limiting for the possibility of the parameters to be checked and adapted.

When selecting the moulding machine to be used for the checking or adaptation, an existing moulding machine, i.e. one allocatable by unique identification (serial number), or a new moulding machine suitable for the moulding process, can be proposed.

Step 11:
The data (electronic tool dataset) that are uniquely allocated to a moulding tool by means of the identity and checked are exported into a dataset readable by the moulding machine and made available to the operating personnel. In the process, the parameters required for a complete dataset in addition to the process settings of the simulation or calculations used from step 6, are obtained e.g. from:

simplified correlations (material, temperature, cycle time, moulding machine, . . . ) and standardized default settings of the moulding machine or an existing electronic tool dataset of the moulding machine.

The complete or incomplete dataset can be made available e.g. via a mobile data medium and/or via remote data transfer connection.

Step 12:

(Corresponding to the subitems in step 11), all of the nominal process settings necessary for the electronic tool dataset and/or amended nominal process settings for the existing electronic tool dataset of the moulding machine are presented, for example, to a simulation engineer and/or setup technician and/or machine operator.

Step 14:

The setup technician and/or machine operator applies the nominal process settings in full or in part and loads them into the moulding machine: Alternatively, the nominal process settings can also be overwritten automatically in step 12.

In a development of this particularly preferred embodiment, after process settings of an injection moulding simulation have been derived from data such as e.g. geometric data of the moulded part, material, actual value curves, etc., these process settings of the virtual moulding machine are thus used, after checking that they can be carried out on a real moulding machine, for carrying out a real moulding process.

A further particularly preferred embodiment of the invention can be formulated as follows, wherein each of the steps can be optional or can be combined with another one in each case:

I. The operating personnel makes the process settings currently made on the moulding machine available to a simulation engineer. Here, as an alternative and/or in addition to process settings of a moulding machine, data such as e.g. material, geometric data of the moulded part, actual value curves from the moulding machine and/or data through manual input can also be made available. An electronic tool dataset is formed.

II. An identity of the moulding tool is created using the features of the electronic tool dataset known from point I. in step c according to the above definition of the method according to the invention.

III. The electronic tool dataset created in step I. is uniquely allocated to the moulding tool by means of the identity created in point II. according to step of the method according to the invention.

IV. For the application in injection moulding simulation software, the electronic tool dataset allocated to the identity in point III. is checked and adapted according to the above definition of step f of the method according to the invention. The use of the injection profile set in the moulding machine may, for example, be mentioned here again by way of example: this does not correspond to the real actual value progression of a screw of the moulding machine, but is modified by the control system of the moulding machine to a path that can be followed by the drive system. This modification can also be effected during the transfer of the data into the simulation, in order to obtain more realistic simulations.

The settings to be applied are then presented to the operator.

V. The simulation engineer arrives at a practicable simulation and an imaging that is close to reality more quickly by means of this procedure.

VI. Then, simulation and actual value data can be compared (manually and/or partly or fully automatically) and selected settings can be correspondingly amended so that a better agreement between simulation and experiment can be brought about. For example, a deviation of the injection pressure can be detected in the holding pressure and, because of this, the holding-pressure profile in the simulation can be adapted.

VII. After the injection moulding simulation, the improved process settings can be transferred back to the moulding machine or a central data memory for storage. In the process, the adaptation carried out in VI. is taken into consideration such that the process setting fits the moulding process really carried out again. This means that, if an offset was introduced in the injection pressure in VI., this is made retrogressively again here. Further conceivable settings in addition to the choice of holding pressure are, e.g.: temperature, cooling, material data, etc.

VIII. The improved process settings and the electronic tool dataset can be made available in VI, both via a mobile data medium and via remote data transfer connection.

The aims of this preferred embodiment of the invention are, for example, an optimization of the injection moulding processes or an error analysis in the production of reject parts.

In a particularly preferred embodiment of the invention, the creation of an identity of a moulding tool on the basis of an injection moulding simulation and the subsequent use of the allocated permitted/prohibited ranges on a real moulding machine is followed by the renewed allocation of the obtained data of the real moulding process to the identity. This iterative process can be carried out multiple times until sufficient information is available, e.g. with respect to cycle time optimization, optimization of the energy efficiency, agreement of simulation and measurement data, . . . or no further information is obtained (see FIG. 3). Furthermore, the first step, i.e. the creation of the identity, can take place on the basis of data of an injection moulding simulation, as mentioned here by way of example, and of a real moulding process.

In a particularly preferred embodiment of the invention, the use of tool-related data (features of the moulding tool dataset) of a first moulding tool for further, not numerically identical second moulding tools in connection with the first moulding machine used for the first moulding tool, and/or second moulding machine is possible, as long as the identity agrees or they lie in an established value range or are contained in a list, i.e. e.g.: $48 \leq ID_{V,Cavity} \leq 50$; $ID_{MaterialClass} \in = [PP, ABS]$.

To check the agreement of identities, functions and functionals can also be defined as a function of the identification marks and characterizing features. In the electronic tool dataset, on the one hand the necessary parameters for the process setting of the injection moulding simulation, such as e.g. the speed profile, pressure profile, temperatures, etc., can be contained directly or also be derived from contained data, such as e.g. the material, the geometric data of the moulded part, etc. Thus, it is also possible to use prohibited/permitted ranges already determined in a step f for a particular first moulding tool in combination with a first moulding machine for further second moulding tools and/or second moulding machines which agree with respect to the identity determined in a step c according to the above definitions, see FIG. 4. In the process, the use of checks on the basis of the prohibited ranges e.g. of process settings of the first and/or second moulding machine used in combination with this second moulding tool can be sufficient to prevent damage to all equipment, for the activation of alarms, the proposal of settings of the second moulding machine to the (partially) automatic setting of the second moulding machine. Furthermore, the use of checks on the basis of the prohibited ranges e.g. of process settings to prevent damage to the equipment, the activation of alarms, the proposal of settings up to the (partially) automatic setting of a second moulding machine can also take place for first moulding tools. Generally speaking, in an embodiment example of the invention it is provided that an adapted electronic tool dataset obtained for a particular first moulding tool in combination with a first moulding machine is used again, either fully or partially, for the first and/or further second moulding tools and/or second moulding machines, which agree with respect to the identity determined in step c.

In addition, after a positive identification, further data from the moulding tool dataset can be downloaded to the control system of the first and/or second moulding machine and/or other computing units and added to the moulding tool dataset. On the basis of the identification method possible through the invention, data are now available which can be utilized in the following ways for example:

presentation of moulding tool-specific and/or moulded part-specific information to the control system of the moulding machine and/or forwarding of moulding tool-specific and/or moulded part-specific and/or production-specific information within the producing organization, e.g. via MES, EPR, . . . .

utilization of moulding tool-specific and/or moulded part-specific information in the control system of the moulding machine for the (guided) setting of a moulding machine and/or production cell by the operator sounding of alarms during operation of a moulding tool on a moulding machine or in a production cell if the operation is effected in at least one safety-relevant prohibited range.

The invention is preferably used in moulding tools in the form of injection moulding tools (particularly preferably plastic injection moulding tools) and moulding machines in the form of injection moulding machines (particularly preferably plastic injection moulding machines).

The computing unit can be formed by any form of an electronic processor, irrespective of where the electronic processor is physically located.

Embodiment examples of the invention are discussed with reference to the figures. There are shown in:

FIGS. 1a-c the sequence of a method according to the invention

Figure 2:
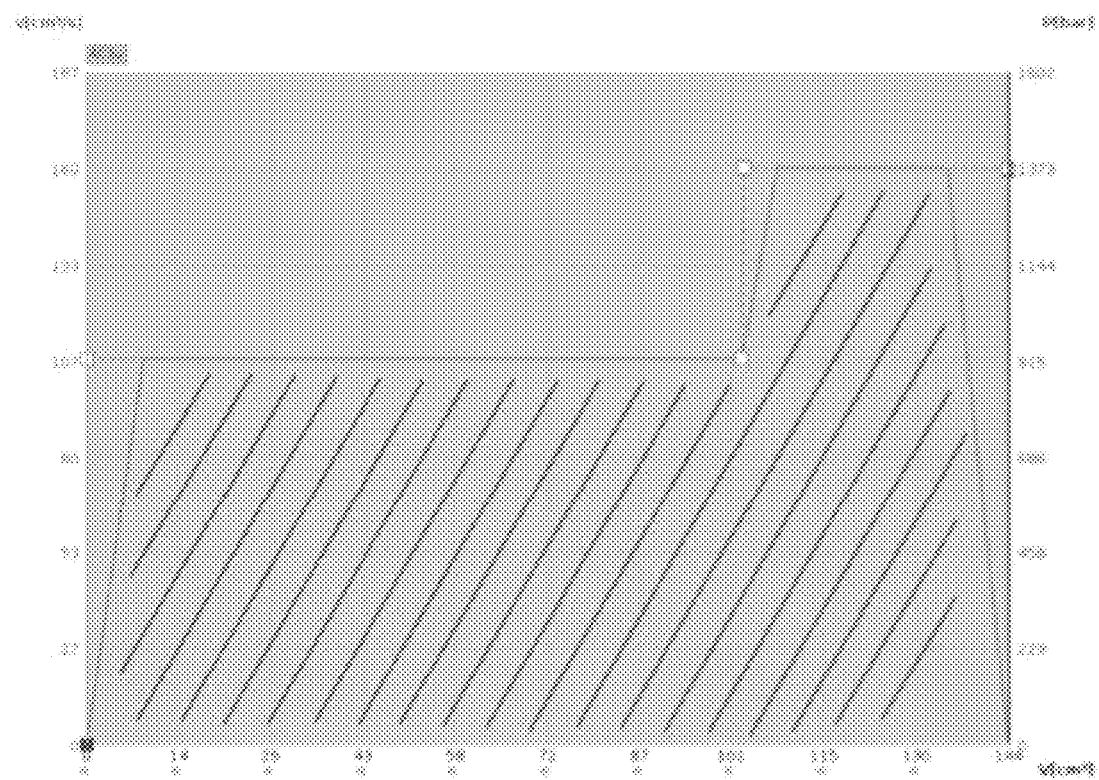

FIG. 2 the definition of permitted and prohibited ranges for a process setting

Figure 3:
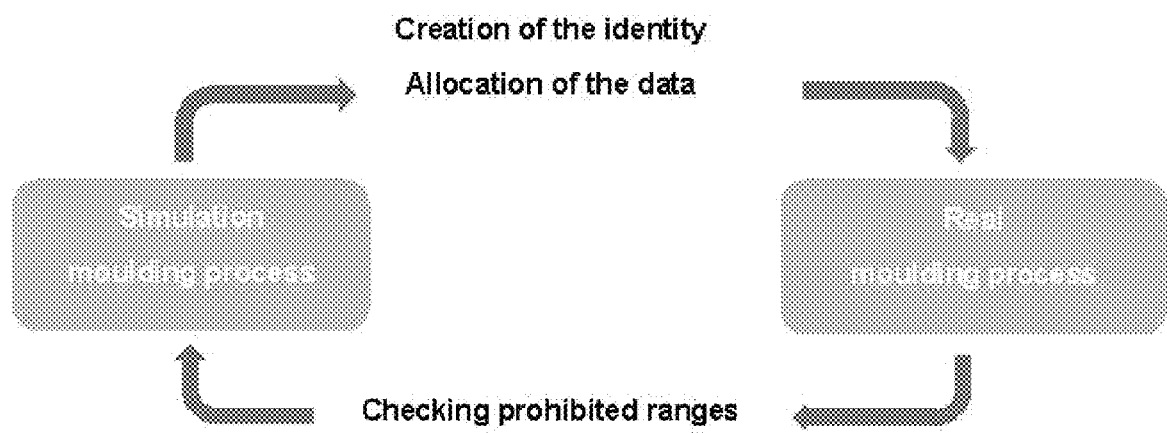

FIG. 3 an iterative method

Figure 4:
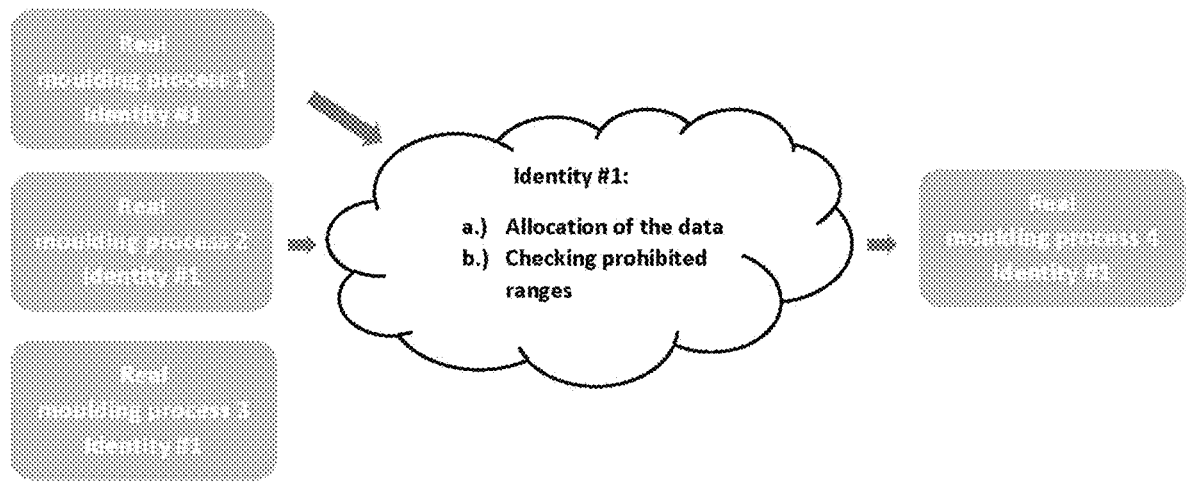

FIG. 4 a further embodiment example of a method according to the invention

FIG. 1a shows the steps a c of a method according to the invention for checking the suitability of a moulding tool for a defined moulding process, using a computing unit 2. In order to prompt the computing unit 2 to carry out steps a-c, a first computer program product can be provided.

In step a, an electronic dataset 1 is provided, comprising a plurality of different features (here with N features) of a moulding tool, in an electronic memory 3, wherein each feature of the plurality of different features has a range of possible values NUM, ALPHA. By way of example, the electronic dataset 1 in FIG. 1 has the following features, among other features:

| Number | Feature: | Code designation: | Unit: |
|---|---|---|---|
| 1 | Metering volume | V, CAVITY | cubic metres |
| 2 | Maximum flow length | L, FLOW LENGTH | metres |
| 3 | Maximum pressure occurring | P, MAX | Pa |
| . . . | . . . | . . . | . . . |
| N-2 | Material class | MATERIAL CLASS | — |
| N-1 | Curve progression of the injection pressure in the injection phase | pINJ | Pa and seconds |
| N | Curve progression of the injection pressure in the holding-pressure phase | pPACK | Pa and seconds |

It may be noted that those features, the value ranges of which are dimensionless, thus have no units (cf. above the feature with number N-2, for example), can also be used, of course.

In step b, at least one feature (here, by way of example, the three features with the numbers 1, 3 and N-2) of the electronic dataset 1 is selected as a characterizing feature by means of a computing unit 2, which is brought into a data-transferring connection with the electronic memory 3.

In step c, an identity ID of the moulding tool is established using a value NUM, ALPHA of the value range of the at least one characterizing feature (here: 1:NUM; 3:NUM; N-2; ALPHA), wherein a moulding tool to be checked is regarded as identical to the moulding tool precisely when the established at least one value NUM, ALPHA is present in relation to the at least one characterizing feature.

FIG. 1b shows the steps d and e of a method according to the invention for checking the suitability of a moulding tool for a defined moulding process, using a computing unit 2. In order to prompt the computing unit 2 to carry out steps d and e, a second computer program product can be provided.

In step d, an electronic tool dataset 4 for the moulding tool is created by means of a computing unit 2, wherein the electronic tool dataset 4 comprises a plurality of different features. The electronic tool dataset 4 is stored in the electronic memory 3.

In step e, the electronic tool dataset 4 is allocated to the moulding tool with the established identity ID by means of a computing unit 2. This allocation is stored in the electronic memory 3.

FIG. 1c shows the step f of a method according to the invention for checking the suitability of a moulding tool for a defined moulding process, using a computing unit 2. In order to prompt the computing unit 2 to carry out step f, a third computer program product can be provided.

In step f, the electronic tool dataset 4 is checked by means of a computing unit 2 in relation to the suitability of a moulding tool with the established identity ID in the defined moulding process. For this purpose, the computing unit 2 has access to the electronic memory 3, in which the electronic tool dataset 4 provided with the identity ID and data 5 defining the moulding process are stored. A notification 6 is issued as the result of the check.

Instead of a first, a second and a third computer program product, a single computer program product can be provided, which prompts the computing unit 2 to carry out steps a-f.

FIG. 2 shows by way of example the definition of permitted and prohibited ranges for a process setting (here: injection profile).

FIG. 3 shows schematically how, in response to the creation of an identity ID of a moulding tool on the basis of an injection moulding simulation and a subsequent use of the allocated permitted/prohibited ranges on a real moulding machine, the renewed allocation of the obtained data of the real moulding process to the identity ID is effected. In this cycle, the identity can optionally be augmented or adapted.

FIG. 4 shows how prohibited/permitted ranges already determined in a step f for a particular first moulding tool in combination with a first moulding machine are used for further fourth moulding tools and/or fourth moulding machines, which agree with respect to the identity determined in a step c according to the above definitions. Further second/third tool datasets of second/third moulding tools, which agree with respect to the ID determined in step c, can be allocated to this ID and used for further calculations.

TABLE 1

| | |
|---|---|
| Moulding tool: | Moulding tool operating procedure, core puller sequence, moulding tool opening schedule |
| | Closed state/maintenance interval |
| | Moulding tool assembly dimensions - moulding tool geometry (overall height, . . . ) |
| | Moulding tool quality criteria - maintenance information |
| | Moulding tool mass |
| | Moulding tool inspection plan (geometry, clearance, completeness, . . . maintenance) ~checklist --> optionally contain information on the operating plan, bearing in mind temperature control, care instructions |
| | Moulding tool storage and preservation strategy e.g.: instruction at the end: spray with corrosion protection |
| | Guidelines for moulding tool care/maintenance |
| | Minimum opening stroke |
| | Last service - dependent on the maintenance policy |
| | Sprue system hot runner/cold runner |
| | Moulding tool ambient conditions - e.g. ambient temperature, cleanroom, air conditioning, . . . |
| | Ventilation |
| | Sprue type, sprue and gate dimensions, |
| | Equipment/moulding tool size |
| | Centring diameter of the fixed platen (FAP) and of the movable platen (BAP) |
| | Number of shots carried out |
| | Moulding tool fixing system - moulding machine equipment |
| | Special treatments/"care instruction", e.g.: special lubricants for high temperatures |
| | Quick coupling systems, . . . |
| | Impression depth, finish, surface roughness; |
| | Moulding tool material (alloy, . . . ) |
| | State of wear measurements - moulding tool reference state |
| | Definition assembly situation |
| | Serial number |
| Material: | Material - type(s), number, dryer, liner, processing temperatures, safety data sheet, additives (GF, . . . ) |
| Cavity: | Shot volume, moulded part mass/shot weight |
| | Number of cavities |
| | Demoulding behaviour, also sprue |
| | Pressures and temperatures in the cavity |
| | Projected surface area |
| | Sensor plan |
| Moulded part: | Inserts - how many, how large, how positioned, . . . |
| | Robot removal position |
| | Geometry - 3D data, fill data, . . . |
| | Moulded part geometry, incl. sprue position |
| | Moulded part coding e.g. laser, polymer additives |
| Ejector system: | Ejector operating mode |
| | Type, thread of the coupling |
| | Bar ejector system - drawing |
| Nozzle: | Nozzle diameter - in the case of extended nozzles |
| | Nozzle radius |
| | Connection - e.g. special thread |
| | Design - shut-off nozzle/open |
| | Nozzle bore |
| | Special and extended nozzle - drawing |
| | Where appropriate heat output and zone allocation |
| Core pullers: | Number |
| | Design, type |
| | Limit switch configuration, limit switch connections, cables |

TABLE 1-continued

| | |
|---|---|
| Temperature control: | Temperature control schedule |
| | Temperature control media |
| | Bracket possibility |
| | Demoulding temperature |
| | Temperature control devices - type, number |
| | Type and number of pipes |
| | Number and type (e.g. DM) of media connections |
| Hot runner: | Hot runner needle valve nozzles - type, max. activation pressure |
| | Where appropriate cascade control |
| | Start-up circuit, automatic start-up system, boost function, during start-up e.g. +15° C., |
| | Number, performance of heating zones, type and configuration of connectors, thermal sensor, data for balancing |
| | Allocation, - here nozzles, here distributors . . . |
| | Electrical diagram |
| | Hot runner geometry |
| Compressed-air connections: | Air valve type - size, pressure |
| Special equipment: | e.g. turntable, index plate, . . . |
| | Moulding tool-specific peripherals |
| Process: | Limitations e.g. injection pressure, clamping force (min./max.), . . . |
| | Sequence (diagram) |
| | Nominal cycle time |
| | Relevant injection parameters e.g. third-party moulding machines; from sampling |
| | Start-up and switch-off information |
| Data: | Most up-to-date part dataset, i.e. including process settings (e.g. for each material which can be processed with this moulding tool) |
| | Machine dataset (current regulator settings, etc.) |
| | Setting datasets of the peripheral devices |
| | Assistance systems and the setting parameters thereof and/or results and/or models |
| Moulded part quality criteria: | Photo(s) of the component, photos of errors to be expected, important dimensions, |
| | Moulded part properties and limits, frequency of testing e.g. inline test every 4 h |
| | Mechanical properties, functions, structural properties --> relevant to demoulding of the ribs |
| | Physicochemical properties |
| | Surface properties, colour specifications |
| | Aesthetic, organoleptic properties |
| Simulation data: | For calculating pressures used, pressure curves, temperatures, times, . . . |
| | Cavities, filling simulation, filling patterns |

LIST OF REFERENCE NUMBERS 1 electronic dataset
2 computing unit
3 electronic memory
4 electronic tool dataset
5 data defining a moulding process
6 notification
NUM numeric value
ALPHA value in the form of a name

The invention claimed is:

1. A method for checking the suitability of a simulated moulding tool to be checked before and for a defined and damage-free moulding process, using a computing unit, comprising at least the following steps:
   a. providing an electronic dataset concerning the moulding process, comprising a plurality of different features of a generally suitable moulding tool, in an electronic memory, wherein each feature of the plurality of different features has a range of possible values;
   b. selecting at least one feature of the electronic dataset as at least one characterizing feature by means of a computing unit, which can be brought into a data-transferring connection with the electronic memory;
   c. establishing an identity of the simulated moulding tool to be checked using at least one value of the value range of the at least one characterizing feature, wherein the simulated moulding tool to be checked is regarded as identical to the generally suitable moulding tool if the established at least one value is present in relation to the at least one characterizing feature;
   d. providing or creating an electronic tool dataset for the simulated moulding tool to be checked by means of the computing unit, wherein the electronic tool dataset comprises a plurality of different features of the simulated moulding tool to be checked;
   e. allocating the electronic tool dataset to the simulated moulding tool to be checked with the established identity by means of the computing unit; and
   f. checking the electronic tool dataset by means of the computing unit in relation to the suitability of the simulated moulding tool to be checked with the established identity in the defined moulding process, wherein prohibited ranges for the features of the electronic tool dataset are predefined and used for checking before the moulding process.

2. The method according to claim 1, wherein the creation of the electronic tool dataset for the simulated moulding tool to be checked at least or solely uses the provided electronic dataset.

3. The method according to claim 1, wherein, as a function of the checking of the electronic tool dataset in relation to the suitability of the simulated moulding tool to be checked with the established identity in the defined moulding process, an adaptation of at least one feature of the electronic tool dataset is carried out, with the result that an adapted electronic tool dataset is obtained for the simulated moulding tool to be checked with the established identity.

4. The method according to claim 3, wherein the step of checking the electronic tool dataset by means of the computing unit in relation to the suitability of the simulated moulding tool to be checked with the established identity in the defined moulding process is repeated with the adapted electronic tool dataset.

5. The method according to claim 1, wherein the electronic tool dataset obtained for a particular first moulding tool in combination with a first moulding machine is used for further second moulding tools and/or second moulding machines, which agree with respect to the identity determined in step c.

6. The method according to claim 1, wherein the value ranges of the plurality of different features of the provided electronic dataset are discrete or continuous and/or include alphanumeric characters.

7. The method according to claim 3, wherein the adapted electronic tool dataset obtained for a particular first moulding tool in combination with a first moulding machine is used for further second moulding tools and/or second moulding machines, which agree with respect to the identity determined in step c.

8. The method according to claim 4, wherein the adapted electronic tool dataset obtained for a particular first moulding tool in combination with a first moulding machine is used for further second moulding tools and/or second moulding machines, which agree with respect to the identity determined in step c.

* * * * *